United States Patent
Tani

(10) Patent No.: US 11,768,642 B1
(45) Date of Patent: Sep. 26, 2023

(54) PRINTING CONTROL APPARATUS THAT REDUCES TIME AND EFFORT IN SECURITY MANAGEMENT FOR PRINTING, PRINTING APPARATUS, CONTROL METHOD THEREFOR, AND STORAGE MEDIUM

(71) Applicant: CANON KABUSHIKI KAISHA, Tokyo (JP)

(72) Inventor: Yoshiaki Tani, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/979,243

(22) Filed: Nov. 2, 2022

(30) Foreign Application Priority Data

Nov. 15, 2021 (JP) .................................. 2021-185797

(51) Int. Cl.
*G06F 3/12* (2006.01)
(52) U.S. Cl.
CPC .......... *G06F 3/1238* (2013.01); *G06F 3/1204* (2013.01); *G06F 3/1222* (2013.01); *G06F 3/1292* (2013.01); *G06F 3/1255* (2013.01)
(58) Field of Classification Search
None
See application file for complete search history.

(56) References Cited

U.S. PATENT DOCUMENTS

| 9,292,236 | B2* | 3/2016 | Ding | G06F 3/1207 |
| 2008/0101706 | A1* | 5/2008 | Maeda | H04N 1/41 |
| | | | | 382/232 |
| 2012/0233537 | A1* | 9/2012 | Kawabata | G06F 16/51 |
| | | | | 715/234 |
| 2013/0301076 | A1* | 11/2013 | Rizzo | G06F 3/1256 |
| | | | | 358/1.15 |
| 2014/0055814 | A1* | 2/2014 | Eguchi | H04N 1/00405 |
| | | | | 358/1.15 |
| 2017/0031638 | A1* | 2/2017 | Kitagata | G06F 3/1206 |

FOREIGN PATENT DOCUMENTS

JP 2014041513 A 3/2014

OTHER PUBLICATIONS

Machine Translation in English of JP Pub 2014041513 A to Tsuchiya Tomoichi.*

* cited by examiner

*Primary Examiner* — Haris Sabah
(74) *Attorney, Agent, or Firm* — ROSSI, KIMMS & McDOWELL LLP

(57) ABSTRACT

A printing control apparatus that reduces time and effort in security management for printing. The printing control apparatus is configured to communicate with a cloud storage that stores a plurality of print data with different degrees of confidentiality in different storage locations according to the degrees of confidentiality. The printing control apparatus receives a printing instruction and obtains installation location information indicating an installation location of a printing apparatus designated in the printing instruction, and storage location information indicating a storage location of print data designated in the printing instruction. Based on the storage location information and the installation location information, it is determined whether or not printing of the designated print data is allowed. When it is determined that printing of the designated print data is allowed, the designated print data is obtained from the cloud storage, and the obtained print data is printed.

12 Claims, 11 Drawing Sheets

*FIG. 7B*

| INSTALLATION LOCATION \ STORAGE LOCATION | Public | Confidential | OTHERS |
|---|---|---|---|
| IN OFFICE | PRINTING ALLOWED ▼ | PRINTING ALLOWED ▼ | PRINTING ALLOWED ▼ |
| SHARED OFFICE | PRINTING ALLOWED ▼ | PRINTING NOT ALLOWED ▼ | PRINTING NOT ALLOWED ▼ |
| HOME | PRINTING ALLOWED ▼ | PRINTING NOT ALLOWED ▼ | PRINTING ALLOWED ▼ |
| OTHERS | ▼ | PRINTING NOT ALLOWED ▼ | PRINTING NOT ALLOWED ▼ |

SETTINGS [PRINTING AVAILABILITY DETERMINATION INFORMATION]

REGISTER

707 — PRINTING ALLOWED / PRINTING NOT ALLOWED

EDIT STORAGE LOCATION    EDIT INSTALLATION LOCATION

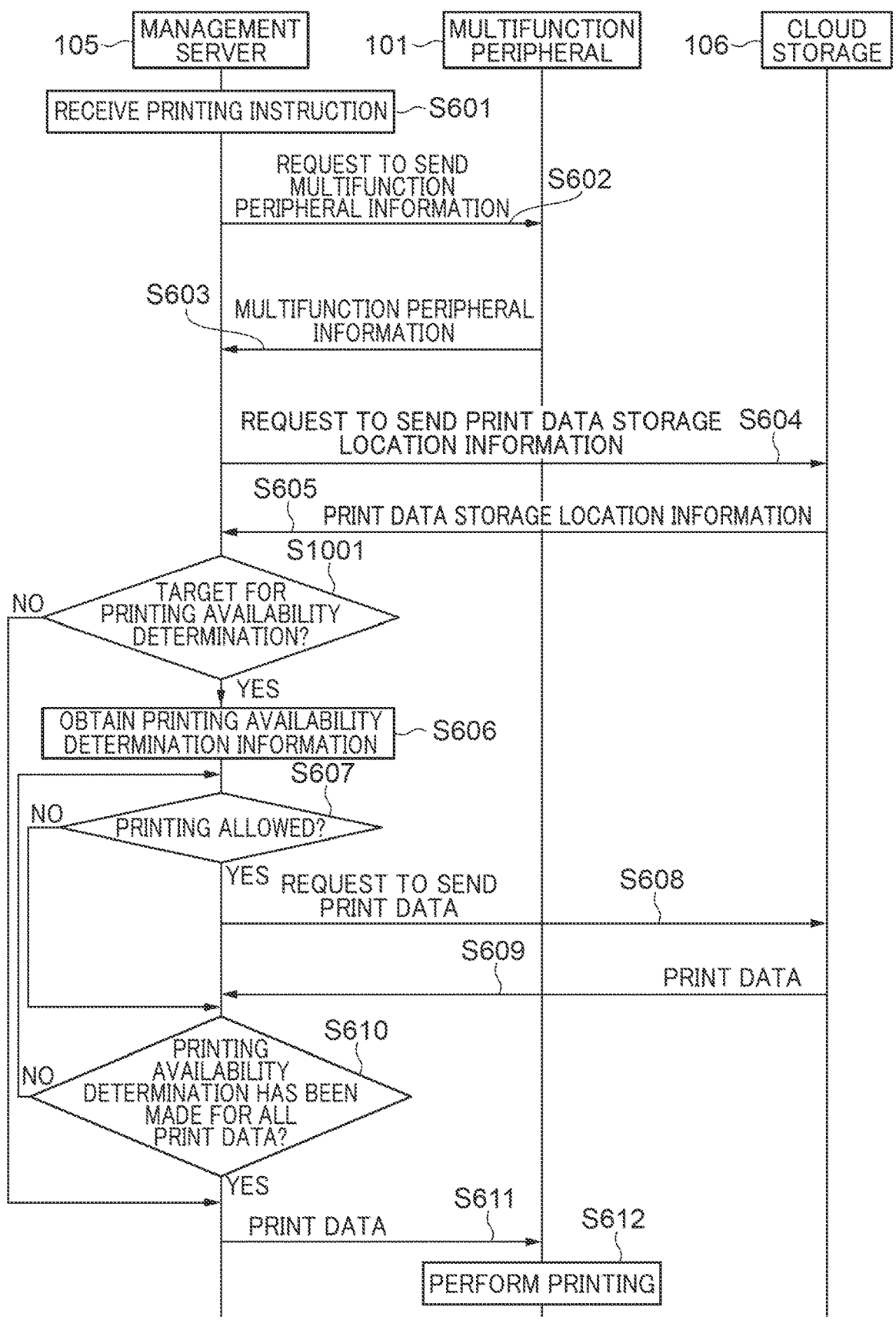

PRINTING CONTROL APPARATUS THAT REDUCES TIME AND EFFORT IN SECURITY MANAGEMENT FOR PRINTING, PRINTING APPARATUS, CONTROL METHOD THEREFOR, AND STORAGE MEDIUM

BACKGROUND OF THE INVENTION

Field of the Invention

The present invention relates to a printing control apparatus, a printing apparatus, a control method therefor, and a storage medium, and in particular to a printing control apparatus that reduces time and effort in security management for printing, a printing apparatus, control method therefor, and a storage medium.

Description of the Related Art

Locations where information equipment and printing apparatuses are installed and user environments have been becoming diversified. For example, cases where information equipment and printing apparatuses are not only accessed from inside firewalls but also accessed directly from external networks such as the Internet have been increasing. Moreover, information equipment and printing apparatuses are faced with problems such as information leakage and attacks by unauthorized operations both inside and outside companies. Under such circumstances, application of appropriate security to information equipment and printing apparatuses according to usage environments is required. For example, there is a printing apparatus that performs printing of print data after determining whether or not printing of the print data is allowed. In this printing apparatus, security levels are set for the printing apparatus and print data respectively, and whether or not printing is allowed is determined based on the set security levels (see, for example, Japanese Laid-Open Patent Publication (Kokai) No. 2014-41513).

However, according to the technique disclosed in Japanese Laid-Open Patent Publication (Kokai) No. 2014-41513, a user needs to set security levels for all of print data to be printed, and it takes time and effort.

SUMMARY OF THE INVENTION

The present invention provides a printing control apparatus that reduces time and effort in security management for printing, a printing apparatus, a control method therefor, and a storage medium.

Accordingly, the present invention provides a printing control apparatus that is configured to communicate with a storage that stores a plurality of print data with different degrees of confidentiality in different storage locations according to the degrees of confidentiality, the printing control apparatus comprising at least one memory that stores a set of instructions, and at least one processor that executes the instructions, the instructions, when being executed, causing the printing control apparatus to: receive a printing instruction; obtain installation location information that indicates an installation location of a printing apparatus designated in the printing instruction; obtain storage location information that indicates a storage location of print data designated in the printing instruction; determine whether or not printing of the designated print data is allowed, based on the storage location information and the installation location information; and when it is determined that printing of the designated print data is allowed, obtain the designated print data from the storage and cause the designated printing apparatus to print the obtained print data.

According to the present invention, time and effort in security management for printing are reduced.

Further features of the present invention will become apparent from the following description of exemplary embodiments with reference to the attached drawings.

BRIEF DESCRIPTION OF THE DRAWINGS

FIGS. 7A and 7B are views showing examples of a setting screen for setting printing availability determination information in Table 3.

FIG. 10 is a sequence diagram showing the flow of a process in which the multifunction peripheral in FIG. 1 prints print data stored in the cloud storage.

DESCRIPTION OF THE EMBODIMENTS

The present invention will now be described in detail below with reference to the accompanying drawings showing an embodiment thereof. Note that in the embodiment described below, a multifunction peripheral (digital multifunction peripheral/MFP/Multi-Function Peripheral) prints print data. However, an apparatus that performs printing is not limited to the multifunction peripheral, and may be an SFP (Single Function Printer) or the like equipped with printing function.

Figure 1:
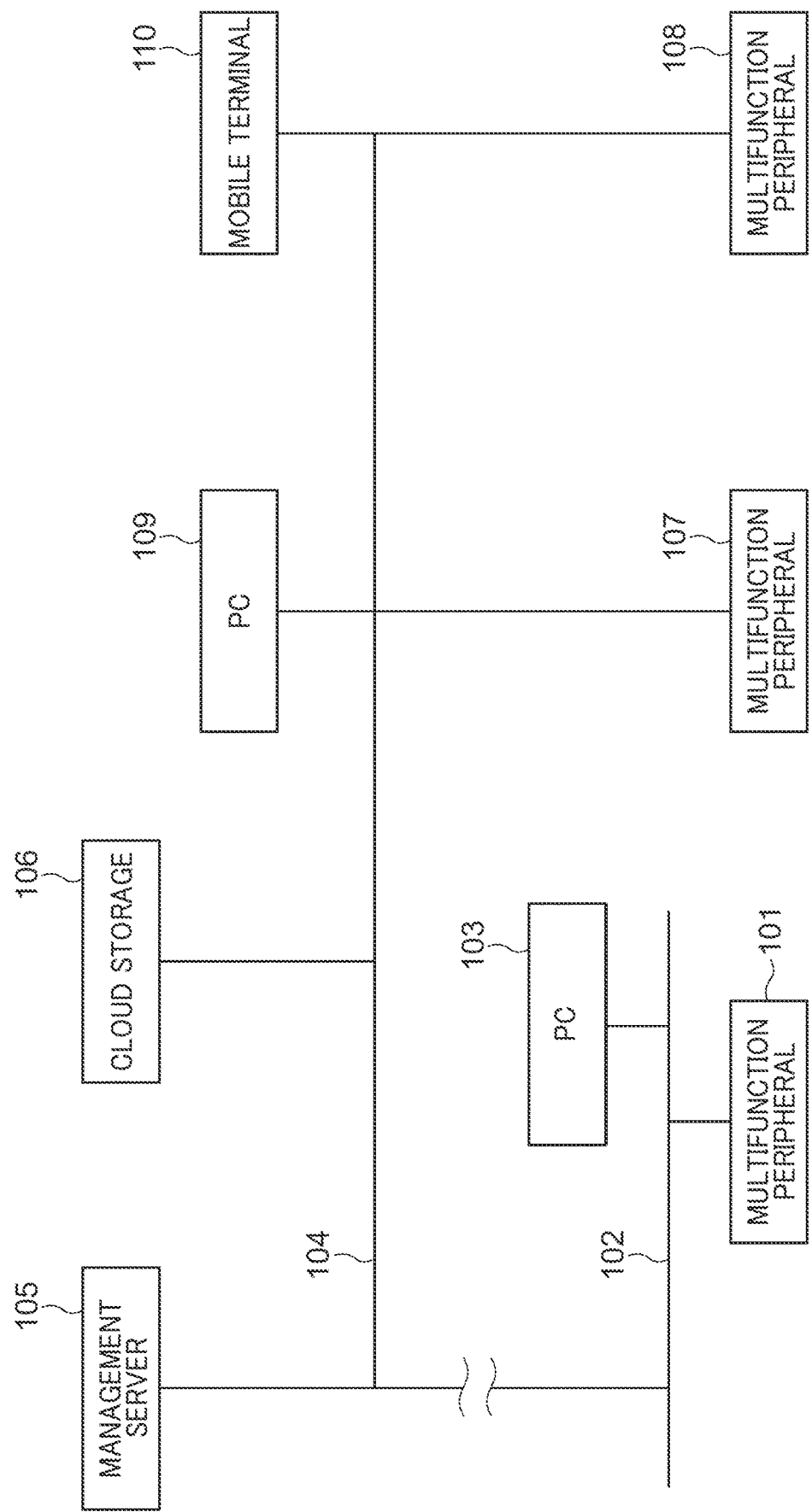
FIG. 1 is a diagram showing an example of a network arrangement of a system including a management server that is a printing control apparatus according to an embodiment of the present invention.

FIG. 1 is a diagram showing an example of a network arrangement of a system including a management server 105 that is a printing control apparatus according to the embodiment of the present invention. Note that the network arrangement in FIG. 1 is just an example, and the numbers of multifunction peripherals, management servers, cloud storage, PCs, and mobile terminals are not limited to the numbers indicated in FIG. 1.

In the system in FIG. 1, a multifunction peripheral 101, which is a printing apparatus, is capable of communicating with a PC 103 via an internal network 102. The internal network 102 is, for example, an internal network protected by a firewall or gateway in an office. The multifunction peripheral 101 sends, for example, image data generated by reading an original or management information on the multifunction peripheral 101 to the PC 103 via the internal network 102.

In the system in FIG. 1, the multifunction peripheral 101 is also capable of communicating with the management server 105 via the internal network 102 and an external network 104. The external network 104 is, for example, a network that can be accessed directly from the Internet. The management server 105 is capable of communicating with a cloud storage 106 via the external network 104. The management server 105 sends print data, which is designated by a user from among a plurality of print data stored in the cloud storage 106, to a multifunction peripheral designated by the user, for example, the multifunction peripheral 101. Note that the PC 103 is capable of directly accessing the cloud storage 106, and therefore the user can designate print data to be printed, by accessing the cloud storage 106 from the PC 103 and operating the PC 103. Thus, in the present embodiment, the multifunction peripheral 101 is capable of obtaining print data, which is designated by the user operating the PC 103 from among a plurality of print data held in the cloud storage 106, via the management server 105.

A multifunction peripheral 107 and a multifunction peripheral 108 are directly connected to the external network 104. Note that in the present embodiment, the multifunction peripheral 107 is installed in, for example, a shared space such as a coworking space. Note that the multifunction peripheral 108 is installed in, for example, a home of a person who works remotely from home. APC 109 and a mobile terminal 110 are capable of directly accessing the cloud storage 106. The user can access the cloud storage 106 from the PC 109 or the mobile terminal 110, and by operating the device having accessed the cloud storage 106, designate print data to be printed. Thus, as with the multifunction peripheral 101, the multifunction peripherals 107 and 108 are also capable of obtaining print data, which is designated by the user operating the PC 109 or the mobile terminal 110 from among a plurality of print data held in the cloud storage 106, via the management server 105.

A description will now be given of a hardware arrangement of the multifunction peripherals 101, 107, and 108. Note that in the present embodiment, the multifunction peripherals 101, 107, and 108 have the similar hardware arrangement, and hence a description will now be given of the hardware arrangement of the multifunction peripheral 101 as an example.

Figure 2:
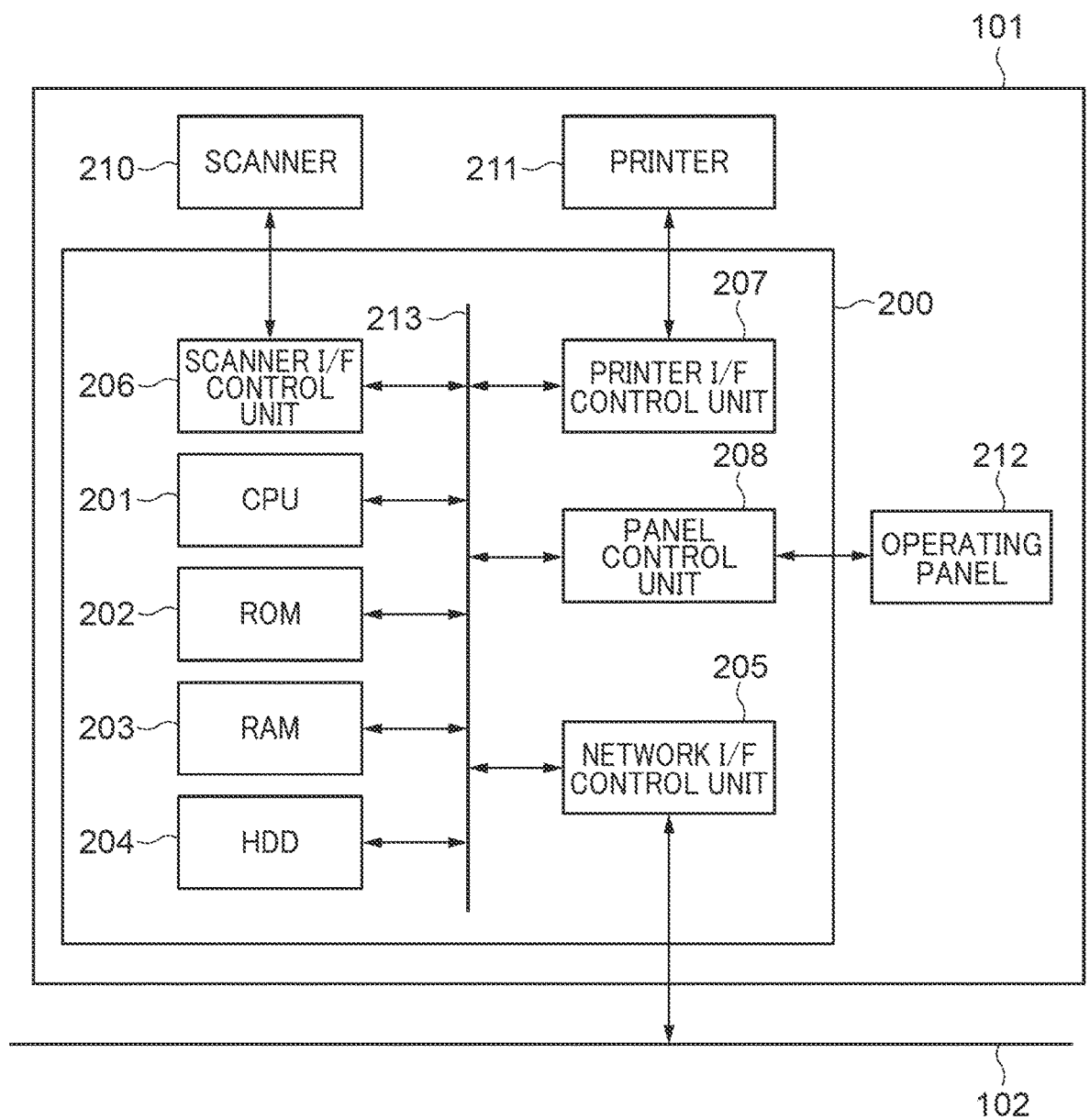
FIG. 2 is a block diagram schematically showing a hardware arrangement of a multifunction peripheral in FIG. 1.

FIG. 2 is a block diagram schematically showing the hardware arrangement of the multifunction peripheral 101 in FIG. 1. Referring to FIG. 2, the multifunction peripheral 101 has a control unit 200, a scanner 210, a printer 211, and an operating panel 212. The control unit 200 is connected to the scanner 210, the printer 211, and the operating panel 212. The control unit 200 has a CPU 201, a ROM 202, a RAM 203, an HDD 204, a network I/F control unit 205, a scanner I/F control unit 206, a printer I/F control unit 207, and a panel control unit 208. These components are connected to one another via a system bus 213.

The CPU 201 executes software programs for the multifunction peripheral 101 to control the overall operation of the multifunction peripheral 101. The ROM 202, which is a read-only memory, stores a boot program, fixed parameters, and so forth for the multifunction peripheral 101. The RAM 203, which is a random access memory, is used as a temporary storage area for programs and various types of data to be used by the CPU 201 in controlling the multifunction peripheral 101. The HDD 204, which is a hard disk drive, stores system software, applications, and various types of data. The CPU 201 executes the boot program stored in the ROM 202, develops the programs stored in the HDD 204 into the RAM 203, and executes the developed programs to control operation of the multifunction peripheral 101. The network I/F control unit 205 controls communication with communication apparatuses such as the PC 103 and the management server 105. The scanner I/F control unit 206 controls scanning of originals performed by the scanner 210. The printer I/F control unit 207 controls operation such as printing performed by the printer 211. The panel control unit 208 controls the operating panel 212 of a touch-panel type. For example, the panel control unit 208 causes the operating panel 212 to display various types of information. The panel control unit 208 also obtains instructions input to the operating panel 212 by the user from the operating panel 212 and transfers the obtained information to the CPU 201.

Figure 3:
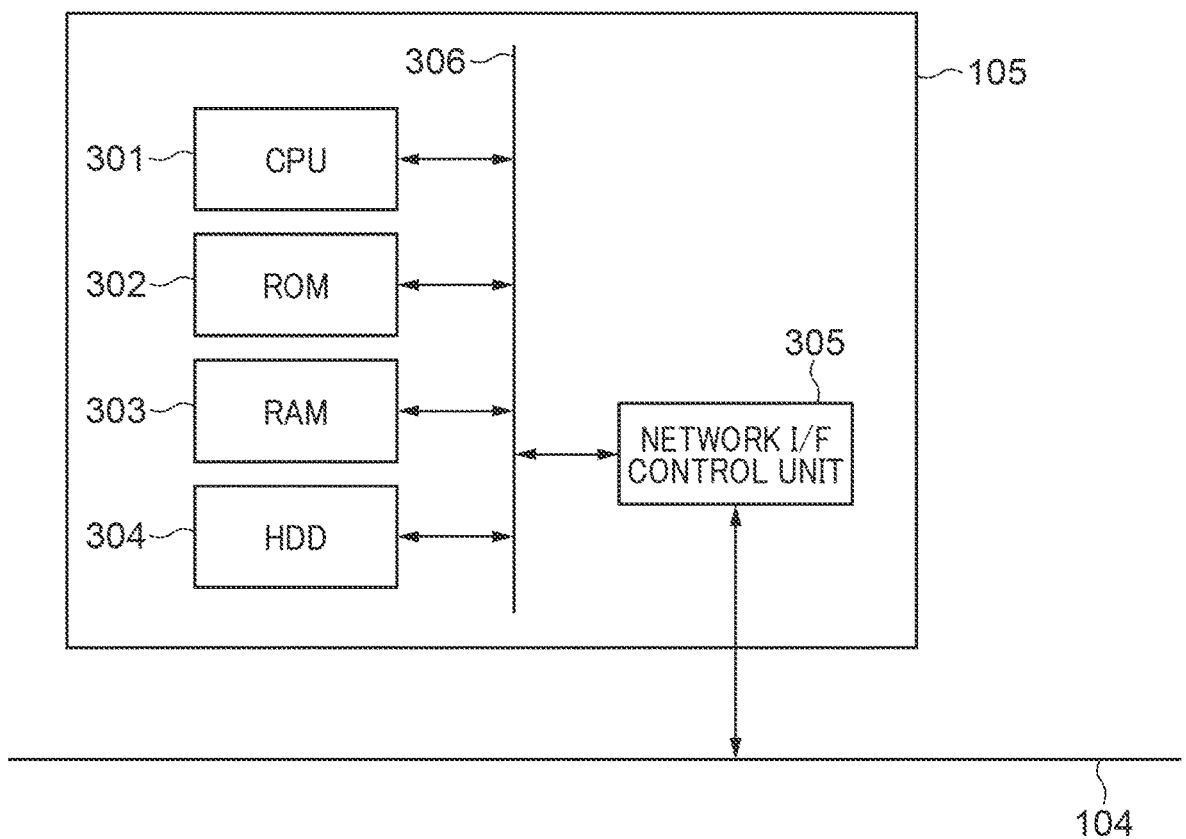
FIG. 3 is a block diagram schematically showing a hardware arrangement of the management server in FIG. 1.

FIG. 3 is a block diagram schematically showing a hardware arrangement of the management server 105 in FIG. 1. Referring to FIG. 3, the management server 105 has a CPU 301, a ROM 302, an HDD 304, and a network I/F control unit 305. These components are connected to one another via a system bus 306.

The CPU 301 executes software programs for the management server 105 to control the overall operation of the management server 105. The ROM 302, which is a read-only memory, stores a boot program, fixed parameters, and so forth for the management server 105. The RAM 303, which is a random access memory, is used as a temporary storage area for programs and various types of data to be used by the CPU 301 in controlling the management server 105. The HDD 304, which is a hard disk drive, stores system software, applications, and various types of data. The CPU 301 executes the boot program stored in the ROM 302, develops the programs stored in the HDD 304 into the RAM 303, and executes the developed programs to control operation of the management server 105. The network I/F control unit 305 controls communication with communication apparatuses such as the multifunction peripheral 101 and the PC 103. An operating unit for the management server 105 is displayed on, for example, a display unit of the PC 103 via the network I/F control unit 305. The operating unit for the management server 105 displayed on, for example, the display unit of the PC 103 is referred to as the "remote UI". The user can issue instructions to the management server 105, by operating the remote UI.

A description will now be given of a software arrangement of the multifunction peripherals 101, 107, and 108. Note that in the present embodiment, the multifunction peripherals 101, 107, and 108 have the similar software arrangement, and hence a description will now be given of the software arrangement of the multifunction peripheral 101 as an example.

Figure 4:
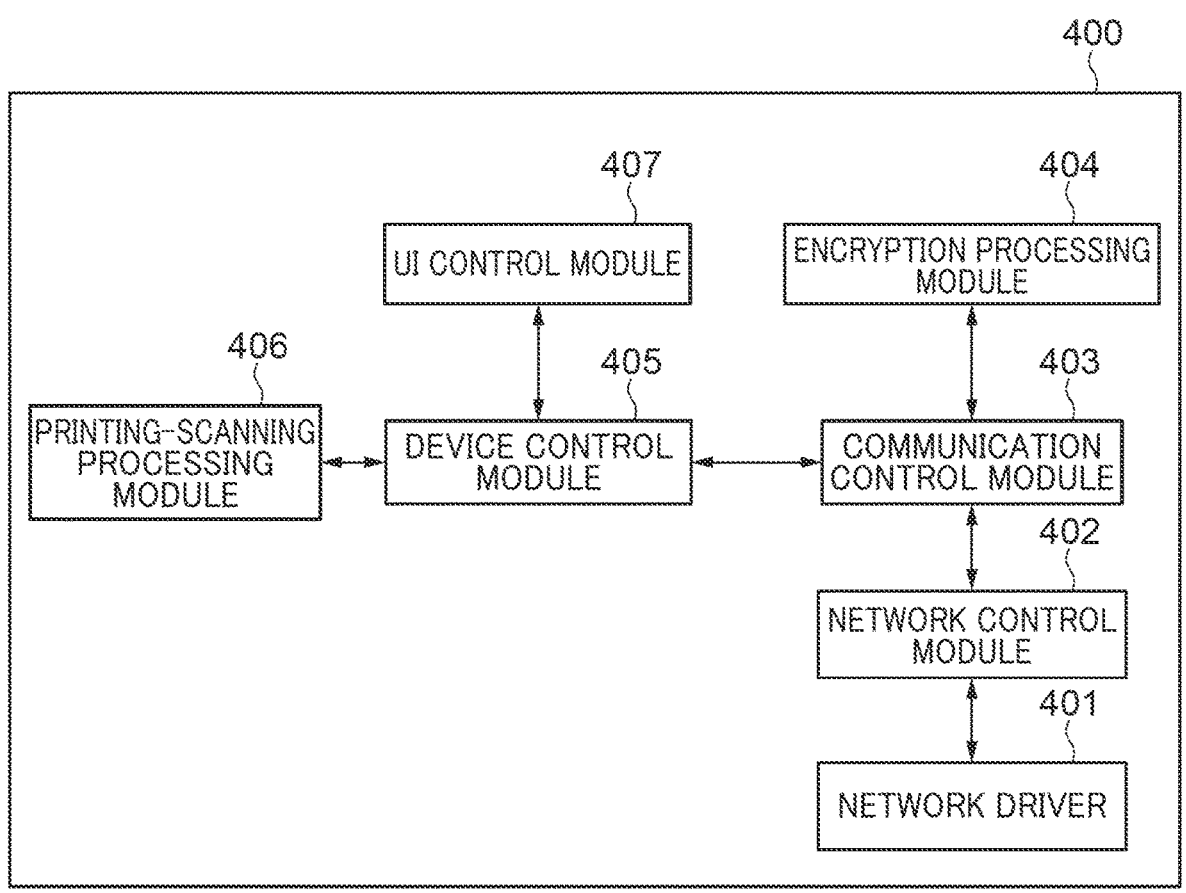
FIG. 4 is a block diagram schematically showing an arrangement of a software module in the multifunction peripheral in FIG. 1.

FIG. 4 is a block diagram schematically showing an arrangement of a software module 400 in the multifunction peripheral 101 in FIG. 1. Referring to FIG. 4, the software module 400 includes a network driver 401, a network control module 402, a communication control module 403, an encryption processing module 404, a device control module 405, a printing-scanning processing module 406, and a UI control module 407. Processes using these modules are implemented by the CPU 201 executing programs developed into the RAM 203.

The network driver 401 controls the network I/F control unit 205 to control communication with the PC 103, the management server 105, and so forth. The network control module 402 sends and receives data by controlling communication in the transport layer and the layers below it in a network communication protocol such as TCP/IP. The communication control module 403 is a module for controlling a plurality of communication protocols supported by the multifunction peripheral 101. For example, the communication control module 403 performs encrypted communication such as TLS supported by the multifunction peripheral 101.

The encryption processing module 404 is a module for carrying out various types of encryption processes such as encryption of data, decryption of data, generation and verification of electronic signatures, and generation of hash values. For example, in an encrypted communication process such as TLS performed by the communication control module 403, the encryption processing module 404 carries out an encryption process. The device control module 405 is a module for integratedly controlling the multifunction peripheral 101 by generating control commands and control data for the multifunction peripheral 101. The device control module 405 executes printing operation instructed via the operating panel 212 or the network I/F control unit 205.

The printing-scanning processing module 406 is a module for implementing functions such as scanning of originals by the scanner 210 and printing by the printer 211. In the present embodiment, the user can issue scanning instructions and printing instructions to the multifunction peripheral 101 from the PC 103 or the operating panel 212. The UI control module 407 is a module for controlling the operating panel 212 and the panel control unit 208.

Figure 5:
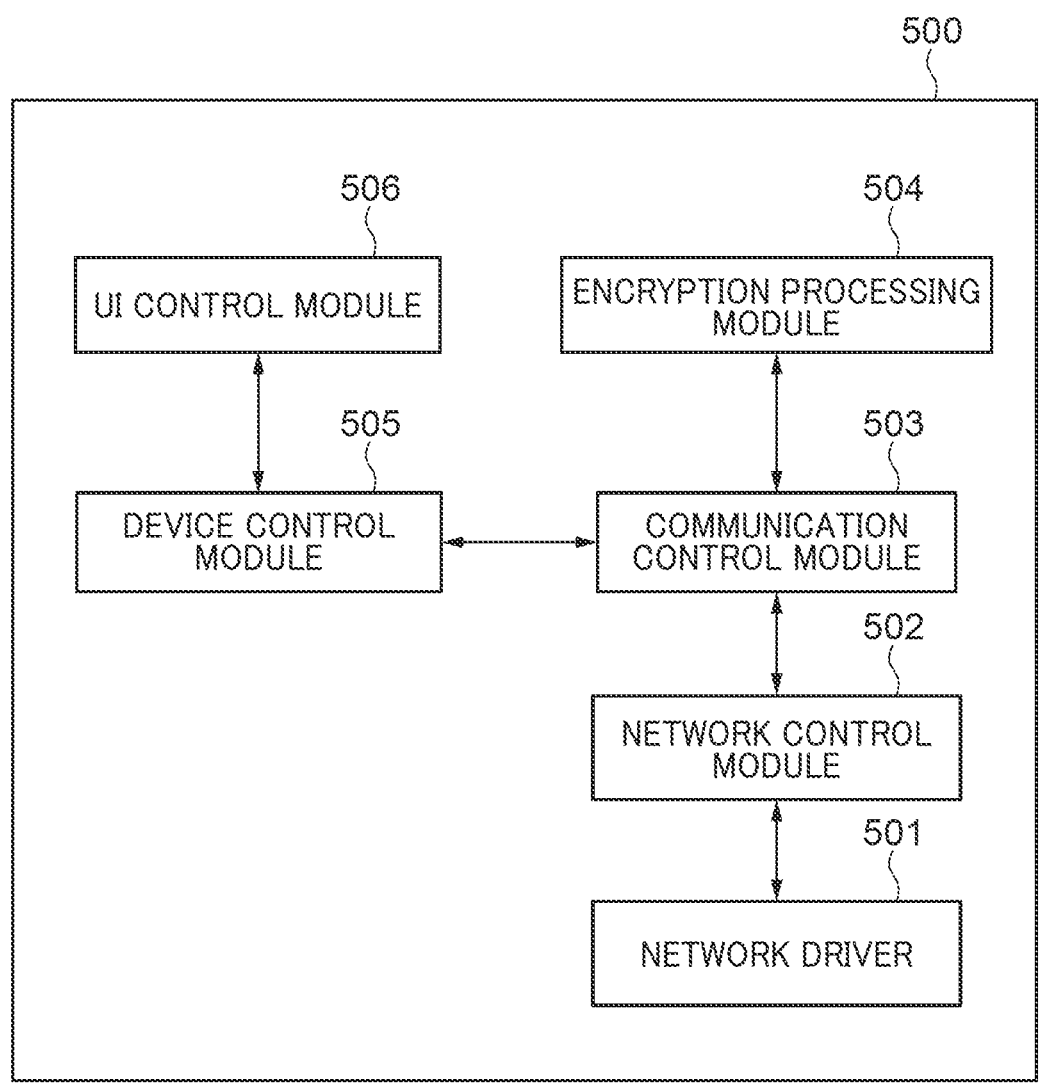
FIG. 5 is a block diagram schematically showing an arrangement of a software module in the management server in FIG. 1.

FIG. 5 is a block diagram schematically showing an arrangement of a software module 500 in the management server 105 in FIG. 1. Referring to FIG. 5, the software module 500 includes a network driver 501, a network control module 502, a communication control module 503, an encryption processing module 504, a device control module 505, and a UI control module 506. Processes by these modules are implemented by the CPU 301 executing programs developed into the RAM 303.

The network driver 501 controls the network I/F control unit 505 to control communication with the multifunction peripheral 101, the PC 103, and so forth. The network control module 502 sends and receives data by controlling communication in the transport layer and the layers below it in a network communication protocol such as TCP/IP. The communication control module 503 is a module for controlling a plurality of communication protocols supported by the management server 105. For example, the communication control module 503 performs encrypted communication such as TLS supported by the management server 105.

The encryption processing module 504 is a module for carrying out various types of encryption processes such as encryption of data, decryption of data, generation and verification of electronic signatures, and generation of hash values. For example, in an encrypted communication process such as TLS performed by the communication control module 503, the encryption processing module 504 carries out an encryption process. The device control module 505 is a module for integratedly controlling the management server 105 by generating control commands and control data for the management server 105. The UI control module 506 controls the remote UI for operating the management server 105. The remote UI is displayed on, for example, the display unit of the PC 103 via the network I/F control unit 305, as described above.

Figure 6:
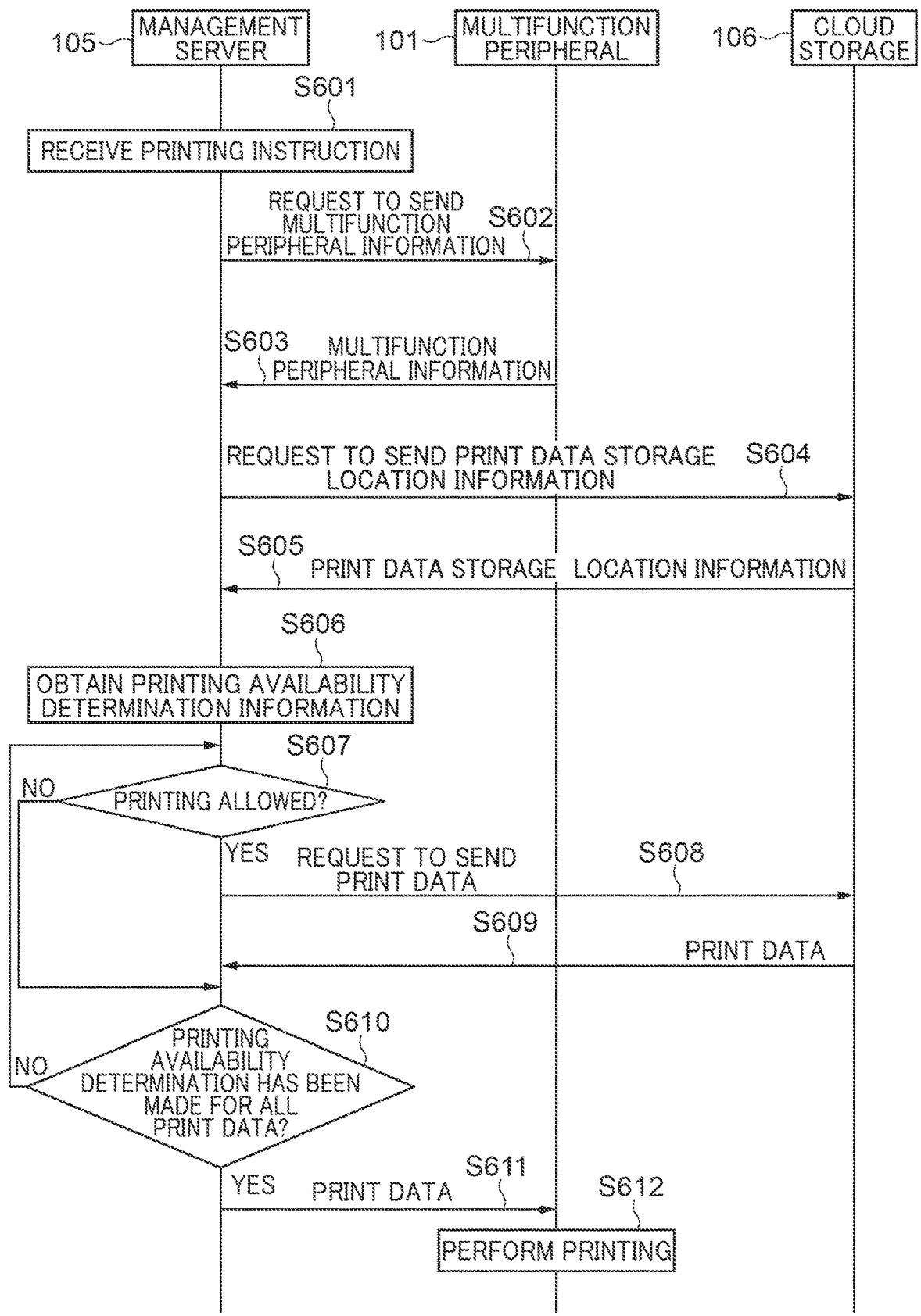
FIG. 6 is a sequence diagram showing the flow of a process in which the multifunction peripheral in FIG. 1 prints print data stored in a cloud storage.

FIG. 6 is a sequence diagram showing the flow of a process in which the multifunction peripheral 101 in FIG. 1 prints print data stored in the cloud storage 106. The process carried out by the multifunction peripheral 101 in FIG. 6 is implemented by the CPU 201 executing a program developed into the RAM 203. The process in by the management server 105 in FIG. 6 is implemented by the CPU 301 executing a program developed into the RAM 303. The process in FIG. 6 is carried out when the user inputs a printing instruction to the remote UI displayed on the PC 103 or the like. In the present embodiment, for example, it is assumed that the user has input a printing instruction for causing the multifunction peripheral 101 to perform printing of print data designated from among a plurality of print data stored in the cloud storage 106.

Referring to FIG. 6, first, the CPU 301 of the management server 105 receives the printing instruction issued by the user (step S601). This printing instruction includes a name of print data designated by the user, information indicating the multifunction peripheral 101, which is a multifunction peripheral designated by the user, information indicating the user that has issued the printing instruction, and so forth. Next, the CPU 301 requests the multifunction peripheral 101 to send multifunction peripheral information (step S602). In accordance with this request, the CPU 201 of the multifunction peripheral 101 sends the multifunction peripheral information exemplified in Table 1 below, to the management server 105.

TABLE 1

| Name | Installation Location |
|---|---|
| Multifunction peripheral A | In office |

The multifunction peripheral information includes a name of the multifunction peripheral 101 and an installation location of the multifunction peripheral 101. Upon receiving the multifunction peripheral information from the multifunction peripheral 101 (step S603), the CPU 301 requests the cloud storage 106 to send information indicating a storage location of the print data designated by the user (hereafter referred to as "the print data storage location information") (step S604). In accordance with this request, the cloud storage 106 sends the print data storage location information exemplified in Table 2 below, to the management server 105.

TABLE 2

| Name of Print Data | Storage Location (file path) |
|---|---|
| Presentation materials. ppt | /ShareDoc/Public/2020/Presentation Materials.ppt |
| Design specifications. docx | /ShareDoc/Confidential/2019/Design Specifications. docx |

The print data storage location information includes a name of print data designated by the user and information indicating a storage location of the print data, for example, a file path to the print data. Upon receiving the print data storage location information from the cloud storage 106 (step S605), the CPU 301 obtains printing availability determination information exemplified in Table 3 below stored in the HDD 304 of the management server 105 or the like (step S606). In the present embodiment, for example, a plurality of printing availability determination information varying with users is stored in the HDD 304 or the like, and the CPU 301 obtains a piece of printing availability determination information for the user who has issued the printing instruction from among the plurality of printing availability determination information.

TABLE 3

| Installation | Storage Location | | |
|---|---|---|---|
| Location | Public | Confidential | Others |
| In office | Printing allowed | Printing allowed | Printing allowed |
| Shared office | Printing allowed | Printing not allowed | Printing not allowed |
| Home | Printing allowed | Printing not allowed | Printing allowed |
| Others | Printing not allowed | Printing not allowed | Printing not allowed |

In the printing availability determination information, information indicating whether or not printing of print data stored in respective folders of the cloud storage 106 is allowed is set for each installation location of a multifunction peripheral. In the present embodiment, the cloud storage 106 stores a plurality of print data with different degrees of confidentiality in different folders according to the degrees of confidentiality. For example, print data with the highest degree of confidentiality is stored in a "Confidential" folder. According to the settings in Table 3, for example, print data stored in a "Public" folder in the management server 105 is allowed to be printed by a multifunction peripheral installed in an office, shared office, or home, and not allowed to be printed by other multifunction peripherals. Note that although in the present embodiment, the printing availability determination information is exemplified in tabular form as described above, the printing availability determination information should not be limited to tabular form.

Then, the CPU 301 carries out printing availability determination by using the multifunction peripheral information, the print data storage location information, the printing availability determination information (step S607). In the step S607, the CPU 301 selects one piece of print data from the print data set in the print data storage location information, and determines whether or not printing of the selected print data is allowed.

When determining in the step S607 that printing of the selected print data is not allowed, the CPU 301 proceeds the process to step S610 without receiving the selected print data from the cloud storage 106.

When determining in the step S607 that printing of the selected print data is allowed, the CPU 301 requests the cloud storage 106 to send the selected print data (step S608). In accordance with this request, the cloud storage 106 sends the print data to the management server 105.

When receiving the print data from the cloud storage 106 (step S609), the management server 105 determines whether or not the printing availability determination has been made for all of the print data set in the print data storage location information (step S610).

In the step S610, when determining that the printing availability determination for the print data for any of the print data set in the print data storage location information has not been made, the CPU 301 returns the process to the step S607. The CPU 301 selects next print data from the print data set in the print data storage location information, and carries out the printing availability determination for the selected print data.

When determining in the step S610 that the printing availability determination has been made for all of the print data set in the print data storage location information, the CPU 301 sends all of the print data received from the cloud storage 106 to the multifunction peripheral 101 (step S611).

The CPU 201 of the multifunction peripheral 101 prints the received print data (step S612) and ends the present process.

Figure 7A:
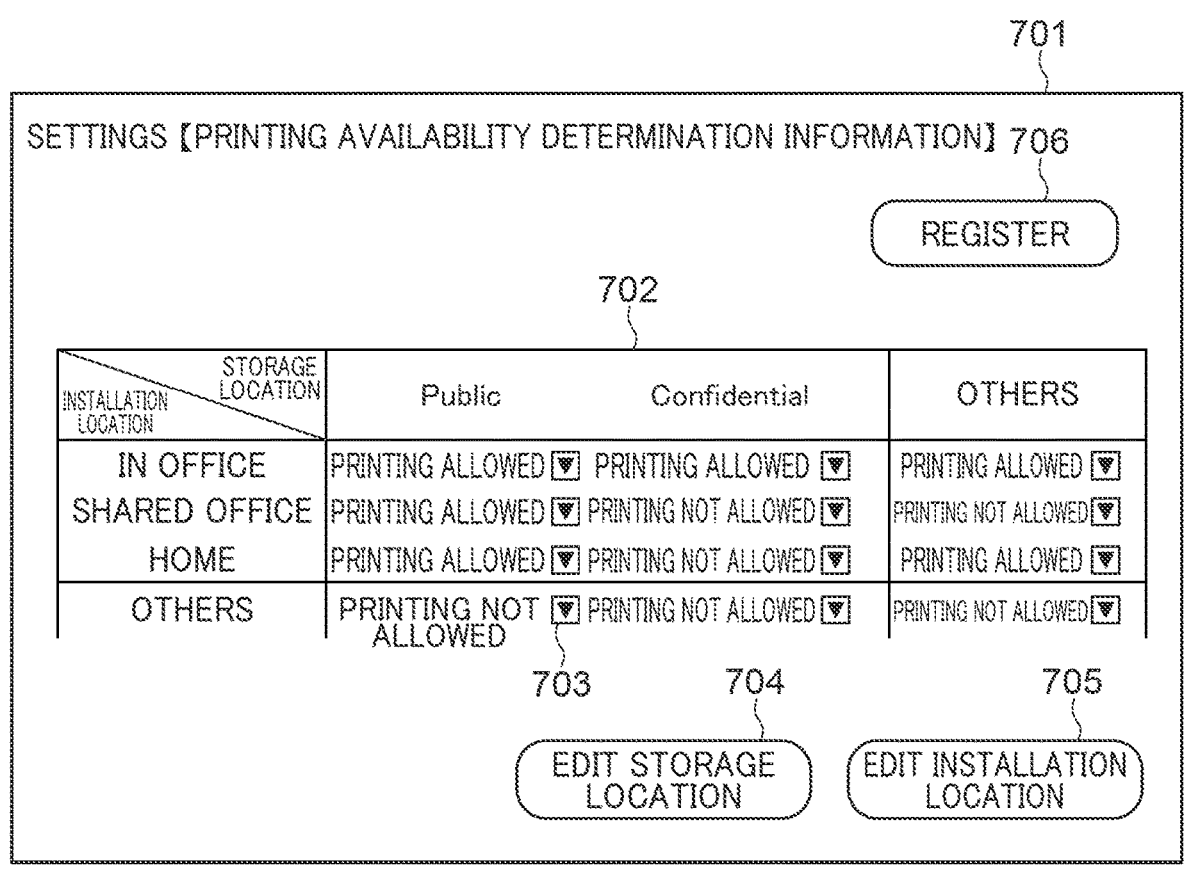

FIGS. 7A and 7B are views showing examples of a setting screen 701 for setting the printing availability determination information in Table 3. The setting screen 701 is allowed to be operated by, for example, only an administrator of the management server 105. When an apparatus capable of displaying the remote UI for the management server 105 accesses the management server 105 so as to set the printing availability determination information, the setting screen 701 is displayed on a display unit of this apparatus.

Examples of the apparatus capable of displaying the remote UI for the management server 105 include the PC 103, the PC 109, and the mobile terminal 110.

As shown in FIG. 7A, the setting screen 701 is comprised of printing availability determination information 702, a storage location information edit button 704, an installation location information edit button 705, and a registration button 706. A plurality of changing buttons for setting information indicating whether or not printing of print data stored in respective folders of the cloud storage 106 is allowed with respect to each storage location of multifunction peripherals is placed in the printing availability determination information 702. For example, to change printing availability determination information for which the installation location of a multifunction peripheral is "Others" and the storage location of print data is "Public", the administrator selects a changing button 703. When the change button 703 is selected, a popup 707 in FIG. 7B is displayed, and the administrator can select "Printing allowed" or "Printing not allowed" from the popup 707. The storage location information edit button 704 is a button for switching the screen to a storage location setting screen 801 in FIG. 8. The installation location information edit button 705 is a button for switching the screen to an installation location setting screen 901 in FIG. 9. The registration button 706 is a button for registering the information set on the setting screen 701. When the registration button 706 is selected, the information that has been changed is stored in the management server 105.

Figure 8:
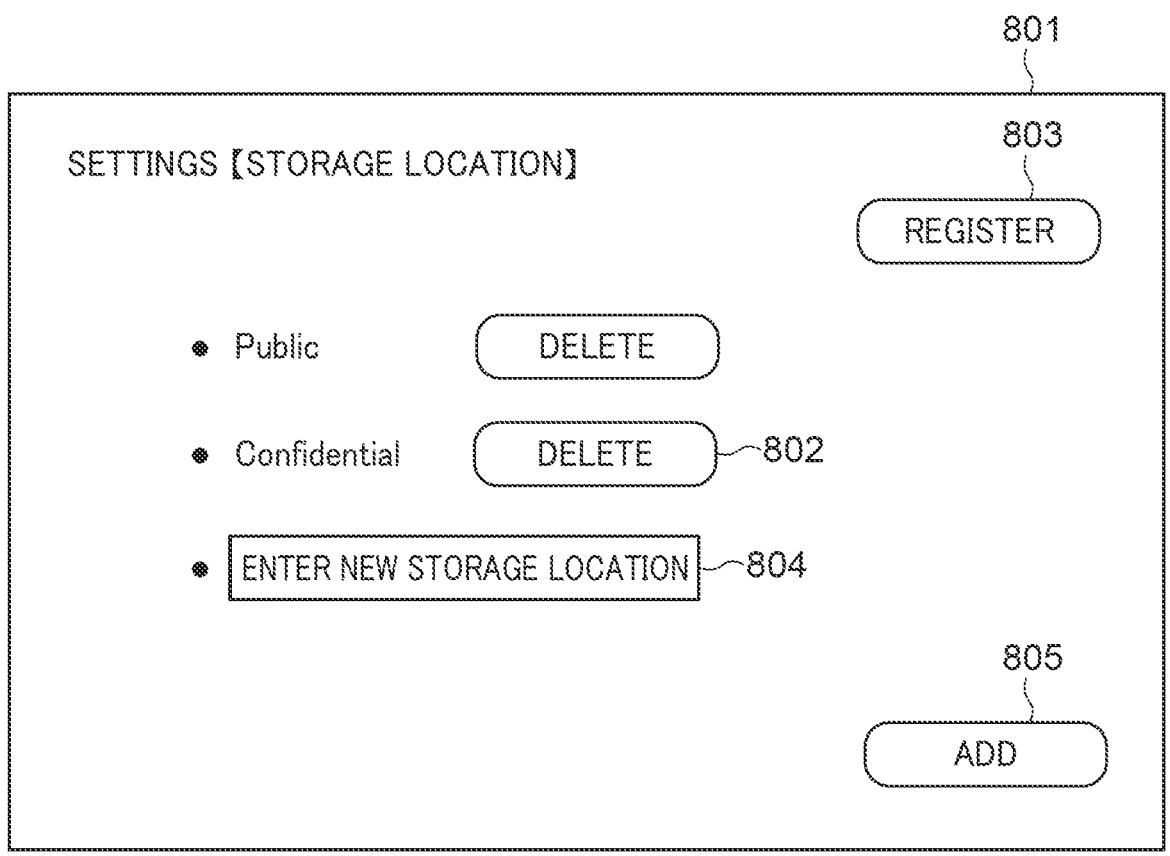
FIG. 8 is a view showing an example of a storage location setting screen that is displayed when a storage location edit button in FIG. 7A is selected.

FIG. 8 is a view showing an example of the storage location setting screen 801 that is displayed when the storage location edit button 704 in FIG. 7A is selected. The storage location setting screen 801 is a screen for editing the storage locations in the printing availability determination information 702. On the storage location setting screen 801, a plurality of delete buttons is displayed for the respective storage locations indicated in the printing availability determination information 702. For example, when the administrator selects a delete button 802 for "Confidential" and then selects a registration button 803 on the storage location setting screen 801, the printing availability determination information on "Confidential" is deleted from the printing availability determination information 702. When the administrator enters a new storage location into an input field 804, selects an add button 805, and then selects the registration button 803 on the storage location setting screen 801, the storage location entered into the input field 804 is newly added to the printing availability determination information 702.

Figure 9:
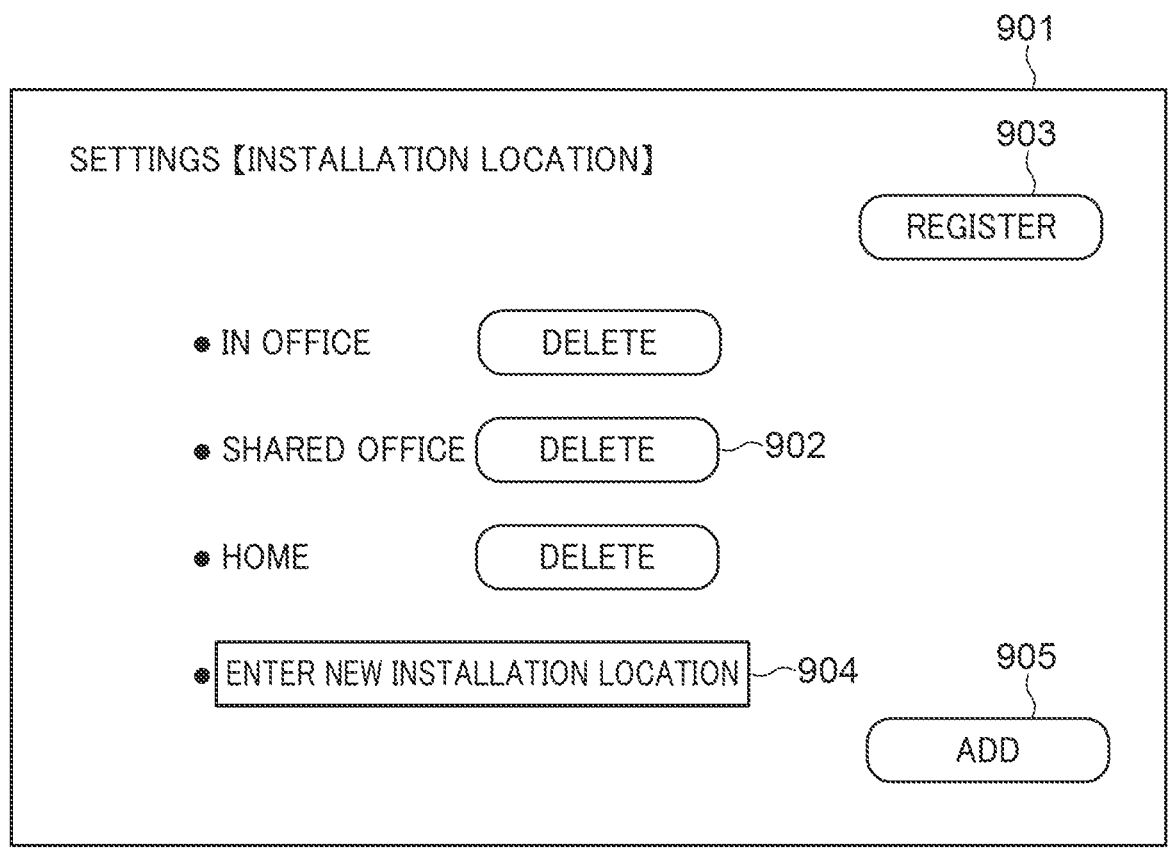
FIG. 9 is a view showing an example of an installation location setting screen that is displayed when an installation location edit button in FIG. 7A is selected.

FIG. 9 is a view showing an example of the installation location setting screen 901 that is displayed when the installation location edit button 705 in FIG. 7A is selected.

The installation location setting screen 901 is a screen for editing the installation locations in the printing availability determination information 702. On the installation location setting screen 901, a plurality of delete buttons is displayed for the respective installation locations displayed in the printing availability determination information 702. For example, when the administrator selects a delete button 902 for "Shared office" and then selects a registration button 903 on the installation location setting screen 901, the printing availability determination information on "Shared office" is deleted from the printing availability determination information 702. When the administrator enters a new installation location into an input field 904, selects an add button 905, and then selects the registration button 903 on the installation location setting screen 901, the storage location entered into the input field 904 is newly added to the printing availability determination information 702.

According to the embodiment described above, whether or not printing of designated print data is allowed is determined based on multifunction peripheral information including information indicating an installation location of a multifunction peripheral and print data storage location information including information indicating a storage location of print data designated by the user. Namely, it is unnecessary for the user to set security levels for all of print data to be printed, as security management for printing. This saves time and effort in security management for printing.

Moreover, according to the embodiment described above, the printing availability determination information in which information indicating whether or not printing of print data stored in folders of the cloud storage 106 is allowed is set for each storage location of a multifunction peripheral is stored in the HDD 304 of the management server 105 or the like. As a result, whether or not printing of designated print data is allowed can be easily determined based on the multifunction peripheral information and the print data storage location information.

In the embodiment described above, the printing availability determination information varying with users is stored. This makes it possible to manage the security of printing with respect to each user while saving time and effort.

Although the present invention has been described by way of the embodiment, the present invention should not be limited to the embodiment described above. For example, when the cloud storage 106 is a storage allowed to be accessed by only an account registered in advance, printing of designated print data may be allowed without the need to determine whether or not printing of the designated print data is allowed.

Although in the embodiment described above, whether or not printing is allowed is determined for all of print data to be printed, there are cases where printing of print data can be allowed without the need to determine whether or not printing is allowed, depending on a storage location of the print data. For example, when a storage location of print data is a storage allowed to be accessed by only an account registered in advance such as a shared storage managed within a company, security is managed in the storage location of the print data (for example, in the shared storage). Thus, a certain level of security can be ensured even if whether or not printing is allowed is not determined. Rather, in this case, with consideration given to the load on the management server 105 imposed by determining whether or not printing is allowed, it is preferable to allow printing of designated print data without determining whether or not printing of the designated print data is allowed.

Accordingly, in the present embodiment, when the cloud storage 106 is a storage allowed to be accessed by only an account registered in advance, printing of designated print data is allowed without the need to determine whether or not printing of the designated print data is allowed.

FIG. 10 is a sequence diagram showing the flow of a process in which the multifunction peripheral 101 in FIG. 1 prints print data stored in the cloud storage 106. The process in FIG. 10 is similar to the process in FIG. 6, and hence only features that are different from those of the process in FIG. 6 will be described below. The process carried out by the multifunction peripheral 101 in FIG. 10 is implemented by the CPU 201 executing a program developed into the RAM 203 as with the process carried out by the multifunction peripheral 101 in FIG. 6. The process carried out by the management server 105 in FIG. 10 is implemented by the CPU 301 executing a program developed into the RAM 303 as with the process carried out by the management server 105 in FIG. 6. The process in FIG. 10 is carried out when the user inputs a printing instruction on the remote UI displayed on the PC 103 or the like as with the process in FIG. 6. As with the process in FIG. 6, it is assumed that in the process in FIG. 10, for example, the user inputs a printing instruction for causing the multifunction peripheral 101 to perform printing of print data designated from among a plurality of print data stored in the cloud storage 106.

Referring to FIG. 10, the processes in the steps S601 to S605 described above are carried out. Then, the CPU 301 of the management server 105 uses the print data storage location information obtained in the step S605 and a printing availability determination target list in Table 4 below to determine whether or not a storage location of print data is a target for the printing availability determination (step S1001).

TABLE 4

| Storage Location of Print Data | Target for Printing Availability Determination |
| --- | --- |
| Public (cloud storage) | Target |
| Confidential (cloud storage) | Target |
| Internal public server | Non-target |
| Company-issued PC | Target |
| Private PC | Non-target |

The printing availability determination target list is stored in the HDD 304 of the management server 105 or the like. For each storage location of print data, information indicating whether or not the storage location is a target for the printing availability determination is set in the printing availability determination target list.

When determining in the step S1001 that the storage location of the print data is a target for the printing availability determination, the CPU 301 proceeds the process to the step S606, and determine whether or not printing of the print data designated by the user is allowed. When determining in the step S1001 that the storage location of the print data is not a target for the printing availability determination, the CPU 301 proceeds the process to the step S611 without the CPU 301 determining whether or not printing is allowed.

In the embodiment described above, when the cloud storage 106 is a storage allowed to be accessed by only an account registered in advance, printing of designated print data is allowed without the need to determine whether or not printing of the designated print data is allowed. This reduces the load on the management server 105 imposed by determining whether or not printing is allowed while ensuring a certain level of security.

Note that although in the embodiment, the multifunction peripheral 101 and the management server 105 are configured as separate apparatuses, this is not limitative, but the multifunction peripheral 101 may include the functions of the management server 105. In the arrangement in which the multifunction peripheral 101 has the functions of the management server 105, the multifunction peripheral information on the multifunction peripheral 101, the printing availability determination information, and the printing availability determination target list are stored in the HDD 204 of the multifunction peripheral 101 or the like, and they are used to carry out the processes in FIG. 6 and FIG. 10. For example, in a process similar to the process in FIG. 6, when receiving a printing instruction via the operating panel 212, the CPU 201 of the multifunction peripheral 101 obtains the multifunction peripheral information on the multifunction peripheral 101 from the HDD 204, and carries out the processes in the steps S604 to S612 in FIG. 6. Thus, also when the arrangement in which the multifunction peripheral 101 has the functions of the management server 105 is applied, the same effects as those in the embodiment described above can be achieved.

Moreover, a storage accessed by the management server 105 (or the multifunction peripheral 101 having the functions of the management server 105) is not limited to the cloud storage 106, but may be apparatus capable of print data such as an on-premise file server, a plurality of cloud storages, or a server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-185797, filed on Nov. 15, 2021, which is hereby incorporated by reference wherein in its entirety.

What is claimed is:

1. A printing control apparatus that is configured to communicate with a storage that stores a plurality of print data with different degrees of confidentiality in different storage locations according to the degrees of confidentiality, the printing control apparatus comprising:
   at least one memory that stores a set of instructions; and
   at least one processor that executes the instructions, the instructions, when being executed, causing the printing control apparatus to:
   receive a printing instruction;
   obtain installation location information that indicates an installation location of a printing apparatus designated in the printing instruction;
   obtain storage location information that indicates a storage location of print data designated in the printing instruction;
   determine whether or not printing of the designated print data is allowed, based on the storage location information and the installation location information; and
   when it is determined that printing of the designated print data is allowed, obtain the designated print data from the storage and cause the designated printing apparatus to print the obtained print data.

2. The printing control apparatus according to claim 1, further comprising a storage device that stores printing availability determination information in which information indicating whether or not printing of print data stored in respective storage locations of the storage is allowed is set for each installation location of the printing apparatus.

3. The printing control apparatus according to claim 2, wherein the storage device stores the printing availability determination information that varies with users.

4. The printing control apparatus according to claim 1, wherein in a case where the storage is allowed to be accessed by only an account registered in advance, the at least one processor causes the printing control apparatus to cause the designated printing apparatus to print the designated print data without determining whether or not printing of the designated print data is allowed.

5. A printing apparatus that is configured to communicate with a storage that stores a plurality of print data with different degrees of confidentiality in different storage locations according to the degrees of confidentiality, the printing apparatus comprising:
   at least one memory that stores a set of instructions; and
   at least one processor that executes the instructions, the instructions, when being executed, causing the printing apparatus to:
   receive a printing instruction;
   obtain installation location information that indicates an installation location of the printing apparatus;
   obtain storage location information that indicates a storage location of print data designated in the printing instruction;
   determine whether or not printing of the designated print data is allowed, based on the storage location information and the installation location information; and
   when it is determined that printing of the designated print data is allowed, obtain the designated print data from the storage and print the obtained print data.

6. The printing apparatus according to claim 5, further comprising a storage device that stores printing availability determination information in which information indicating whether or not printing of print data stored in respective storage locations of the storage is allowed is set for each installation location of the printing apparatus.

7. The printing apparatus according to claim 6, wherein the storage device stores the printing availability determination information that varies with users.

8. The printing apparatus according to claim 5, wherein in a case where the storage is allowed to be accessed by only an account registered in advance, the at least one processor causes the printing apparatus to print the designated print data without determining whether or not printing of the designated print data is allowed.

9. A control method for a printing control apparatus that is configured to communicate with a storage that stores a plurality of print data with different degrees of confidentiality in different storage locations according to the degrees of confidentiality, the control method comprising:
 receiving a printing instruction;
 obtaining installation location information that indicates an installation location of a printing apparatus designated in the printing instruction;
 obtaining storage location information that indicates a storage location of print data designated in the printing instruction;
 determining whether or not printing of the designated print data is allowed, based on the storage location information and the installation location information; and
 when it is determined that printing of the designated print data is allowed, obtaining the designated print data from the storage and causing the designated printing apparatus to print the obtained print data.

10. A control method for a printing apparatus that is configured to communicate with a storage that stores a plurality of print data with different degrees of confidentiality in different storage locations according to the degrees of confidentiality, the control method comprising:
 receiving a printing instruction;
 obtaining installation location information that indicates an installation location of the printing apparatus;
 obtaining storage location information that indicates a storage location of print data designated in the printing instruction;
 determining whether or not printing of the designated print data is allowed, based on the storage location information and the installation location information; and
 when it is determined that printing of the designated print data is allowed, obtaining the designated print data from the storage and printing the obtained print data.

11. A computer-readable non-transitory storage medium that stores a program for causing a computer to execute a control method for a printing control apparatus that is configured to communicate with a storage that stores a plurality of print data with different degrees of confidentiality in different storage locations according to the degrees of confidentiality, the control method comprising:
 receiving a printing instruction;
 obtaining installation location information that indicates an installation location of a printing apparatus designated in the printing instruction;
 obtaining storage location information that indicates a storage location of print data designated in the printing instruction;
 determining whether or not printing of the designated print data is allowed, based on the storage location information and the installation location information; and
 when it is determined that printing of the designated print data is allowed, obtaining the designated print data from the storage and causing the designated printing apparatus to print the obtained print data.

12. A computer-readable non-transitory storage medium that stores a program for causing a computer to execute a control method for a printing apparatus that is configured to communicate with a storage that stores a plurality of print data with different degrees of confidentiality in different storage locations according to the degrees of confidentiality, the control method comprising:
 receiving a printing instruction;
 obtaining installation location information that indicates an installation location of the printing apparatus;
 obtaining storage location information that indicates a storage location of print data designated in the printing instruction;
 determining whether or not printing of the designated print data is allowed, based on the storage location information and the installation location information; and
 when it is determined that printing of the designated print data is allowed, obtaining the designated print data from the storage and printing the obtained print data.

\* \* \* \* \*